Sept. 23, 1930.  W. J. NOLAN  1,776,445
CAMERA
Filed Feb. 23, 1928  4 Sheets-Sheet 1
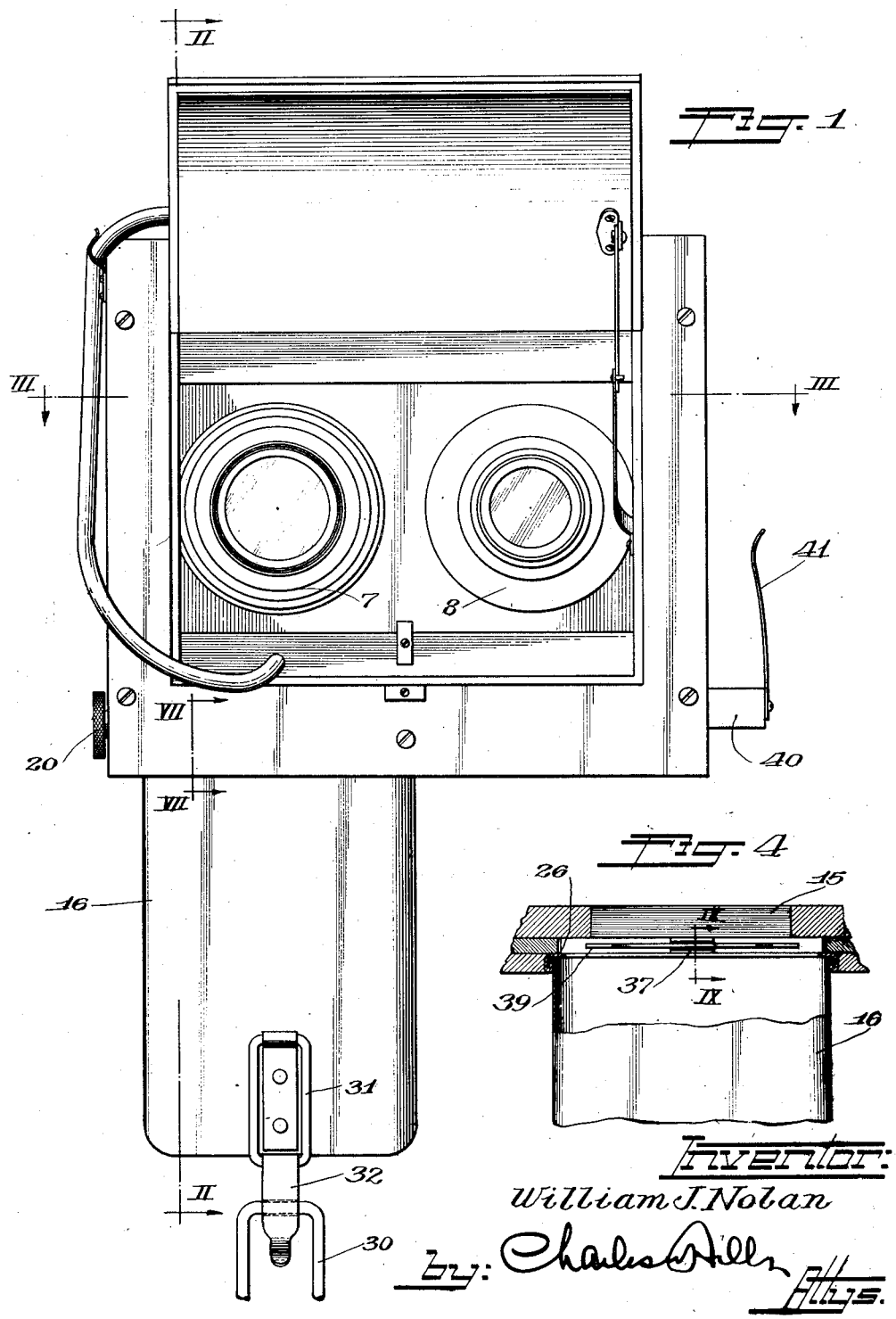

Sept. 23, 1930.  W. J. NOLAN  1,776,445
CAMERA
Filed Feb. 23, 1928    4 Sheets-Sheet 2
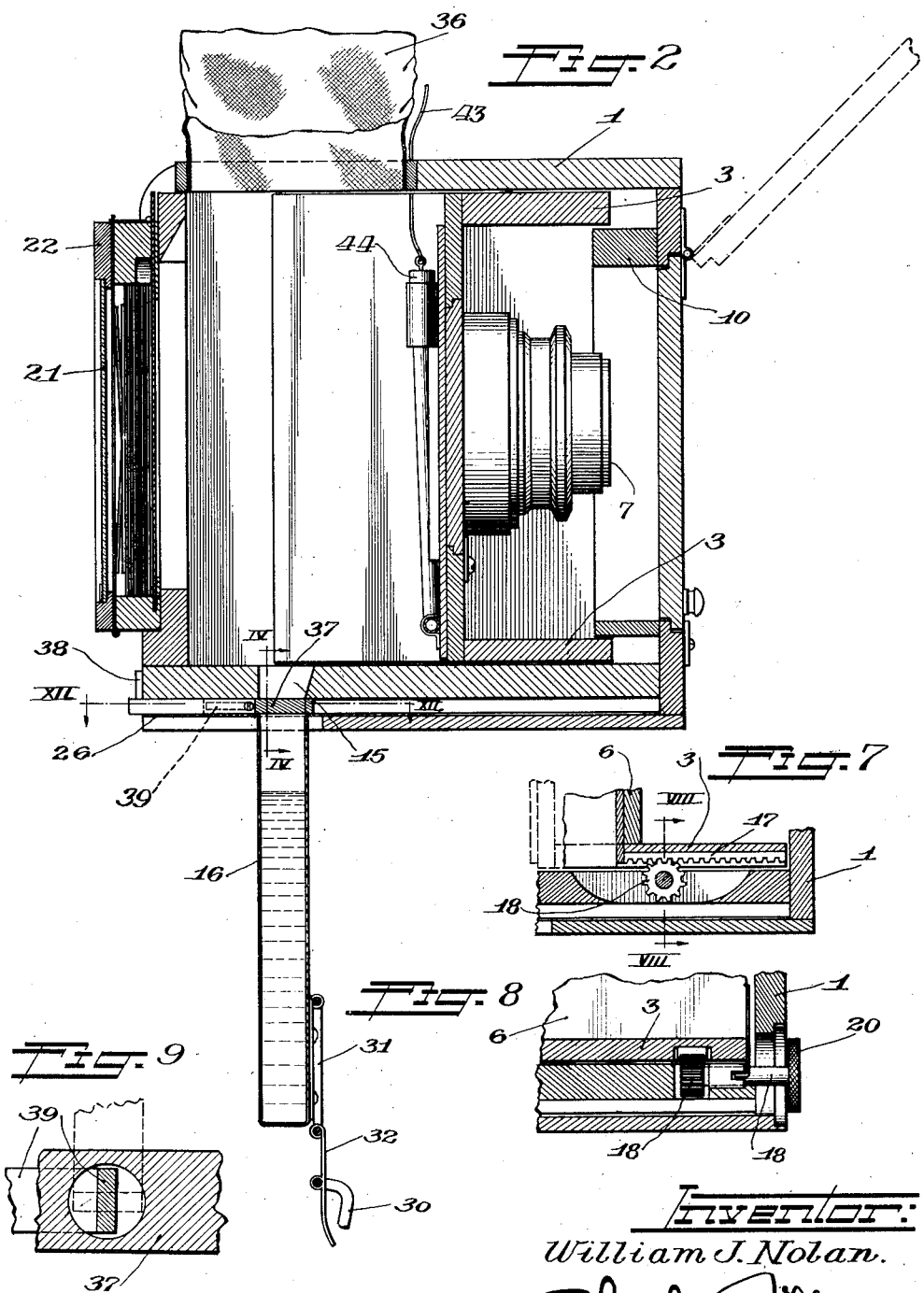
Inventor:
William J. Nolan.
by: Charles Hill
Attys.

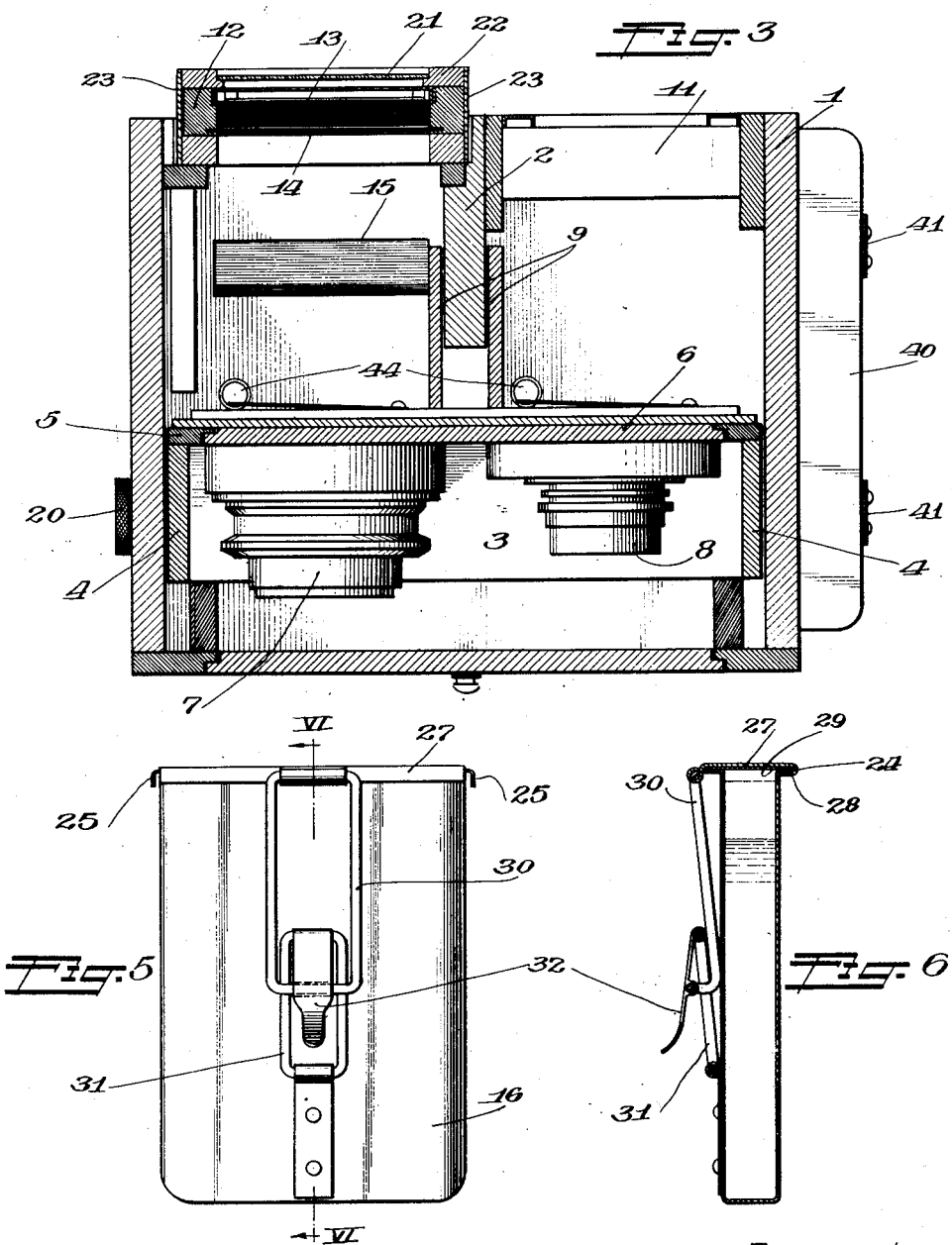

Sept. 23, 1930. W. J. NOLAN 1,776,445
CAMERA
Filed Feb. 23, 1928 4 Sheets-Sheet 4
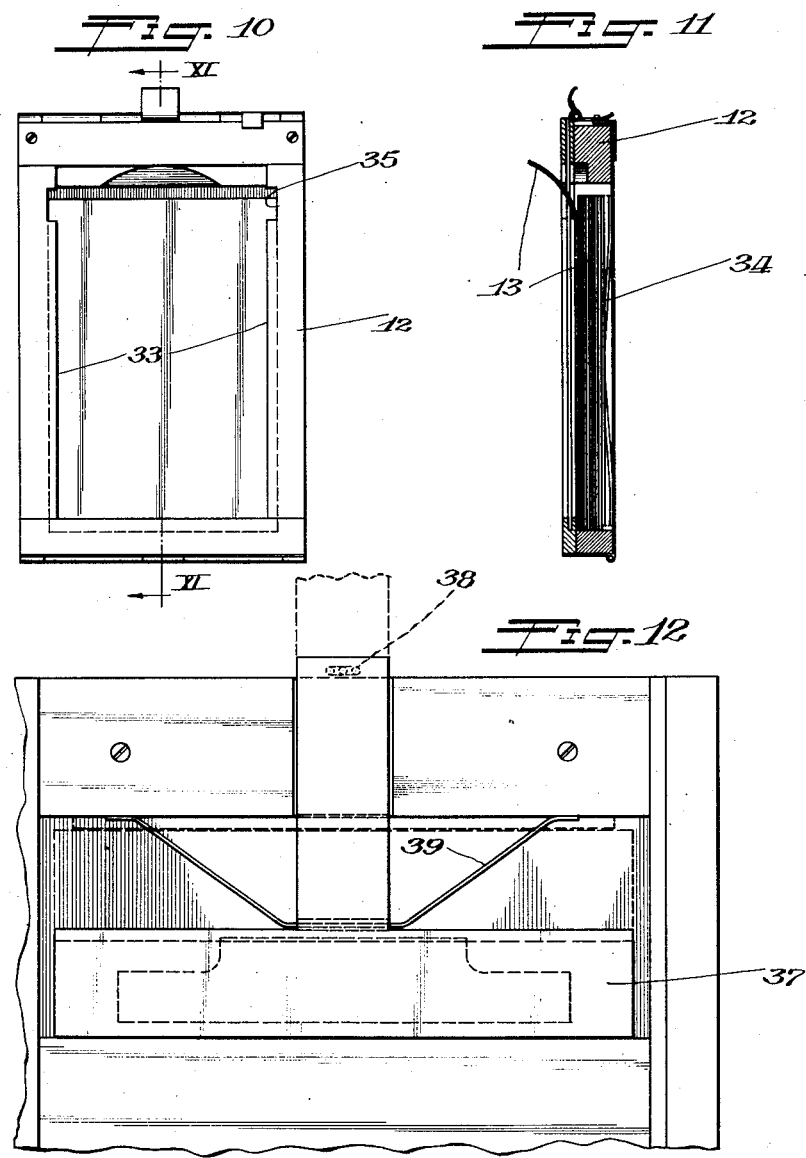

Patented Sept. 23, 1930

1,776,445

UNITED STATES PATENT OFFICE

WILLIAM J. NOLAN, OF CHICAGO, ILLINOIS, ASSIGNOR TO MARY A. NOLAN, OF BOSTON, MASSACHUSETTS

CAMERA

Application filed February 23, 1928. Serial No. 256,097.

This invention relates to cameras, more particularly such as that shown in my copending application Serial No. 166,359, filed February 7, 1927.

In that application I have disclosed a camera adapted to take pictures simultaneously on two rolls of film. Developing means was provided so that one of the pictures might be developed immediately, leaving the companion picture to be developed later.

With the above apparatus using two rolls of film, it was necessary to cut off each exposure of the roll intended for immediate development before such development.

One of the principal objects of the present invention is to provide a device in which the cutting of film after each exposure is unnecessary.

With this object in view, I employ cut film in a film pack or other suitable holder and remove each film after exposure from the holder and drop it into the developing tank.

Other and further important objects of this invention will be apparent from the disclosures in the accompanying drawings and the following specification.

The invention (in a preferred form) is illustrated on the drawings and hereinafter more fully described.

On the drawings:

Figure 1 is a front elevation of the camera.

Figure 2 is a section on the line II—II of Figure 1.

Figure 3 is a section on the line III—III of Figure 1.

Figure 4 is a section on the line IV—IV of Figure 2.

Figure 5 is a front elevation of container for developer.

Figure 6 is a section on the line VI—VI of Figure 5.

Figure 7 is a section on the line VII—VII of Figure 1.

Figure 8 is a section on the line VIII—VIII of Figure 7.

Figure 9 is a section on the line IX—IX of Figure 4.

Figure 10 is a front elevation of the film holder with the dark slide removed.

Figure 11 is a section on the line XI—XI of Figure 10.

Figure 12 is a section on the line XII—XII of Figure 2.

As shown on the drawings:

The camera consists of a casing 1 divided in its rear half by a vertical partition 2 into two chambers. Extending transversely of the casing in front of the partition 2 is a frame slidable to and fro in the casing. The frame consists of top and bottom portions 3, side portions 4 and back 5. The back 5 is apertured to receive a lens board 6 upon which are mounted lenses 7 and 8.

Focusing is accomplished by moving the frame to and fro in the casing by means of the customary rack 17 and pinion 18. The pinion is mounted on a rod 19 extending completely across the camera so as to allow rack and pinion to be arranged at each side of the frame and thus insure parallel movement of the frame relatively to the casing. The usual knurled wheel 20 is provided on the projecting end of the rod for turning the latter and the pinions mounted thereon.

Movement of the frame to and fro must take place without leakage of light either from the front around the frame or from one rear chamber to the other.

While the frame which carries the lens board fits reasonably closely within the casing, it is desirable, for the purpose of excluding light, to provide an inwardly extending frame 10 attached to the front of the camera casing so as to provide a space between such frame and the outer walls of the camera casing into which the bottom and top members 3 and sides 4 of the lens carrying frame may slide.

While the two rear compartments of the camera casing are separated by a partition 2, this partition alone is not enough to prevent light passing from one compartment to the other, since, in focusing the image on the film, there is necessarily a space between the forward end of the partition 2 and the back of the frame. Hence, to allow movement of the frame without allowing light to pass, two rearwardly extending plates 9 are secured to the back of the frame. One of these plates is arranged on one side of the partition 2 and the other on the other.

The light sensitive material used for immediate development usually requires more light than the material used for subsequent development, and so, to obtain the requisite light for the former, the lens 7 is of larger aperture than the lens 8.

The lenses are arranged not only so that they may be moved to and fro simultaneously, but are also arranged so that shutters thereof may be operated simultaneously. Duplicate shutter operating means are so well known that I need not illustrate or describe such apparatus in detail.

When it is desired to use a ground glass for focusing purposes, it is desirable to open the shutter of one lens only, viz. that opposite the ground glass. For that purpose I have provided a string 43 passing through the top of the camera casing and attached to the shutter control mechanism 44.

If the lenses are both in the same plane and both are arranged so that their axes pass through the center of their respective films, the images on the latter will be offset with respect to each other. As shown, the lens for the temporary film is directly in front of its film but the permanent film is offset outwards so that between 4 to 7 feet the field covered by the two lenses is substantially equal.

Behind the lens 8 is arranged a suitable support 11 for a roll of film and conveniently this supporting means may be similar in construction to that employed in any of the small film cameras now on the market, so that the details of the film supporting means or of the means for winding the film from one spool to another need not be illustrated or described.

Behind the lens 7 the casing is apertured for the reception of a sensitive sheet holder 12, which contains the requisite number of such sheets 13, with the usual dark slide 14 in front of the same. These sensitive sheets preferably consist of cut film having a celluloid base of much greater thickness than that of ordinary roll film to aid in the handling of the film for development and later for inspection. Preferably, either the film or the method of development is such that the resulting picture is a positive and not a negative.

Permanently connected to the back of the camera behind the aperture for the holder 12 is a ground glass 21 in a frame 22 carried by spring-controlled links 23. These links permit the holder 12 to be slipped in front of the ground glass frame and be held in place thereby. When the holder 12 is removed the spring links 23 move the ground glass up into proper position for focusing.

The film holder 12 is constructed so that the sheets of film may be removed by hand from the front of the holder instead of the rear, as in the ordinary film pack holder. For this purpose, the inwardly extending flanges 33 of the holder which retain the film in place against the pressure of a spring 34 are formed with cutaway parts 35 adjacent the upper margins of the film sheets and the upper part of the holder is cut away above the upper ends of the film sheets, so that the latter may be manually withdrawn, as indicated in Figure 11.

In the bottom of the casing in front of the cut film holder 12 is a slot 15 of a greater length than the width of the cut film employed. Beneath this slot is detachably secured a tank or container 16 adapted to hold a suitable developing solution. In the top of the casing above this slot is an aperture large enough to allow the passage of one's hand therethrough for the purpose of allowing the operator to insert his hand into the casing to pull out from the holder 12 the sheet of film which has been exposed and drop it into the solution in tank 16. Obviously this operation must be carried out without admitting any light into the casing. For this purpose, to the margin of the aperture in the top of the casing is secured a tube of flexible, light impervious material 36, which may conveniently be provided with an elastic band at its outer end to cause the material to lie closely against the operator's arm, and thereby insure exclusion of all light from entering the tube.

The tank 16 is of rectangular form and is provided with outwardly and laterally extending flanges 24 along its long edges and with hooked or turned down flanges 25 at its short edges. The turned down flanges 25 slidably engage upwardly turned flanges in a plate 26 secured to the bottom of the camera case to allow the tank to be detachably secured beneath the aperture 15.

To avoid the spilling of developer from the tank 16 when not in use, a cap 27 is provided having one margin turned over to receive one of the flanges 24 of the tank 16, as shown in Figure 6. To the other margin of the cap a wire loop 30 is pivotally attached. A second wire loop 31 is pivotally attached to the lower part of the tank and the free ends of these two loops are pivotally engaged with a toggle lever 32 by which the cap may be drawn down onto the top of the tank. A rubber or other gasket 29 aids in the making of liquid-tight contact between the cap and the margin of the tank. When the toggle lever 32 is raised, the cap is lifted and its turned edge 28 may then be disengaged from the flange 24 and the cap allowed to drop down, as shown in Figure 1. The tank is then ready for attachment to the bottom of the camera casing. After use, the tank is disconnected from the camera and the cap replaced. With the cap construction shown, there is no possibility of the cap being lost or mislaid, as it is always connected to the tank.

The slot 15 in the bottom of the camera casing is normally closed by a T-shaped sliding member 37, the head of which is adapted to cover the slot while the central arm extends rearwardly between the back of the camera casing so that, by means of a ring or knob 38, the member may be retracted.

A spring 39 normally holds the member 37 in slot closing position, as shown in Figure 2 and in full lines in Figure 12. The spring is formed of a narrow, thin steel strip of the cross-section shown in Figure 9 and passes through a circular hole in the member 37 so that it is free to turn at right angles, as shown in dotted lines in Figure 2. When the member 37 is retracted and the spring 39 compressed, the latter at the extreme rearward position of the member 37 snaps into the position shown in dotted lines in Figure 9 and exerts sufficient friction to hold the member 37 in retracted position.

For convenience, a shelf 40 is provided along one side of the camera casing with upturned spring members 41 for holding the film holder 12, tank 16, additional films, or the like.

I am aware that many changes may be made, and numerous details of construction may be varied through a wide range without departing from the principles of this invention, and I, therefore, do not purpose limiting the patent granted hereon otherwise than necessitated by the prior art.

I claim as my invention:

A camera comprising two lenses, means for supporting a roll of light sensitive material, means for supporting a sheet of light sensitive material of a size sufficient for a single picture only, means for exposing a portion of said roll and said sheet simultaneously, a developing tank, and means for transferring said sheet after exposure from said supporting means to said tank.

In testimony whereof I have hereunto subscribed my name.

WILLIAM J. NOLAN.